US008645996B2

(12) United States Patent
Heo et al.

(10) Patent No.: US 8,645,996 B2
(45) Date of Patent: Feb. 4, 2014

(54) DIGITAL BROADCAST RECEIVER AND A METHOD FOR PROVIDING A GRAPHICAL USER INTERFACE

(75) Inventors: So Hee Heo, Gyeonggi-do (KR); Jae Kyung Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 639 days.

(21) Appl. No.: 12/873,873

(22) Filed: Sep. 1, 2010

(65) Prior Publication Data

US 2011/0055873 A1 Mar. 3, 2011

(30) Foreign Application Priority Data

Sep. 1, 2009 (KR) .......................... 10-2009-0082094

(51) Int. Cl.
*H04N 5/445* (2011.01)

(52) U.S. Cl.
USPC ............. 725/37; 345/156; 345/157; 345/173; 715/700; 715/773

(58) Field of Classification Search
None
See application file for complete search history.

(56) References Cited

U.S. PATENT DOCUMENTS

| 2001/0026274 | A1 | 10/2001 | Saruwatari | |
| 2003/0112223 | A1 | 6/2003 | Kim | |
| 2004/0066405 | A1 | 4/2004 | Wessler et al. | 345/764 |
| 2004/0257238 | A1 | 12/2004 | De Jongh | 340/825 |
| 2007/0294636 | A1* | 12/2007 | Sullivan | 715/810 |
| 2009/0006941 | A1 | 1/2009 | Yoshida | 715/227 |
| 2010/0171700 | A1* | 7/2010 | Sharan | 345/161 |

FOREIGN PATENT DOCUMENTS

| CN | 1289081 | 3/2001 |
| CN | 1427357 | 7/2003 |
| EP | 1 770 482 A1 | 4/2007 |
| EP | 2 034 391 A1 | 3/2009 |
| JP | 2000-076239 | 3/2000 |
| JP | 2006-343873 | 12/2006 |

OTHER PUBLICATIONS

European Search Report for Application No. 10006733.9 dated Dec. 6, 2010.
Chinese Office Action dated Aug. 31, 2012 for Application 201010263528.X.

* cited by examiner

*Primary Examiner* — Chenea Smith
(74) *Attorney, Agent, or Firm* — KED & Associates LLP

(57) ABSTRACT

A digital broadcast receiver may display virtual keys on a screen, the virtual keys may be provided in a plurality of regions, each region having an identifier and characters that are unique from other regions. The digital broadcasting receiver may receive at least one input corresponding to selection of the identifier for selection of a desired character, wherein the desired character and at least one other character in a different region are displayed differently on the screen.

23 Claims, 13 Drawing Sheets

DIGITAL BROADCAST RECEIVER AND A METHOD FOR PROVIDING A GRAPHICAL USER INTERFACE

CROSS-REFERENCE TO RELATED APPLICATION

This application claims priority benefit from Korean Patent Application No. 10-2009-0082094, filed Sep. 1, 2009, the subject matter of which is hereby incorporated by reference.

BACKGROUND

1. Field

Embodiments of the present invention may relate to a digital broadcast receiver and a method for providing a graphical user interface using a digital broadcast receiver. More particularly, embodiments may relate to a digital broadcast receiver for allowing a user to easily enter desired information using a graphical user interface displayed on a display screen and a method for providing a graphical user interface.

2. Background

Broadcast receivers may provide content produced by broadcast stations that may be transmitted through radio transmission media, such as terrestrial, cable and/or satellite broadcasting. A user may watch the transmitted content through a broadcast receiver capable of receiving the transmitted content via the respective transmission media.

However, as digital broadcast technologies based on digital broadcasting are developed and become commercially available, breaking from existing analog broadcasting, various types of content services (e.g. real-time broadcasts, Contents on Demand (CoD), games and news) may be provided to the user using an Internet network coupled to each home, besides the existing transmission media or cable media.

An Internet Protocol TV (IPTV) may be an example of providing content services over the Internet. The IPTV may be a service that transmits and provides various information services, moving image content, broadcast content, etc. to a user's receiver over the Internet. The Internet network may be implemented based on an Internet Protocol (IP) on various networks including an optical cable network, coaxial cable network, Fiber To The Home (FTTH), telephone network, wireless network, etc.

In using the Internet network, bidirectionality may be additionally provided and the user may watch data of a desired content service at his or her convenience. This may differ from general terrestrial broadcasting.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
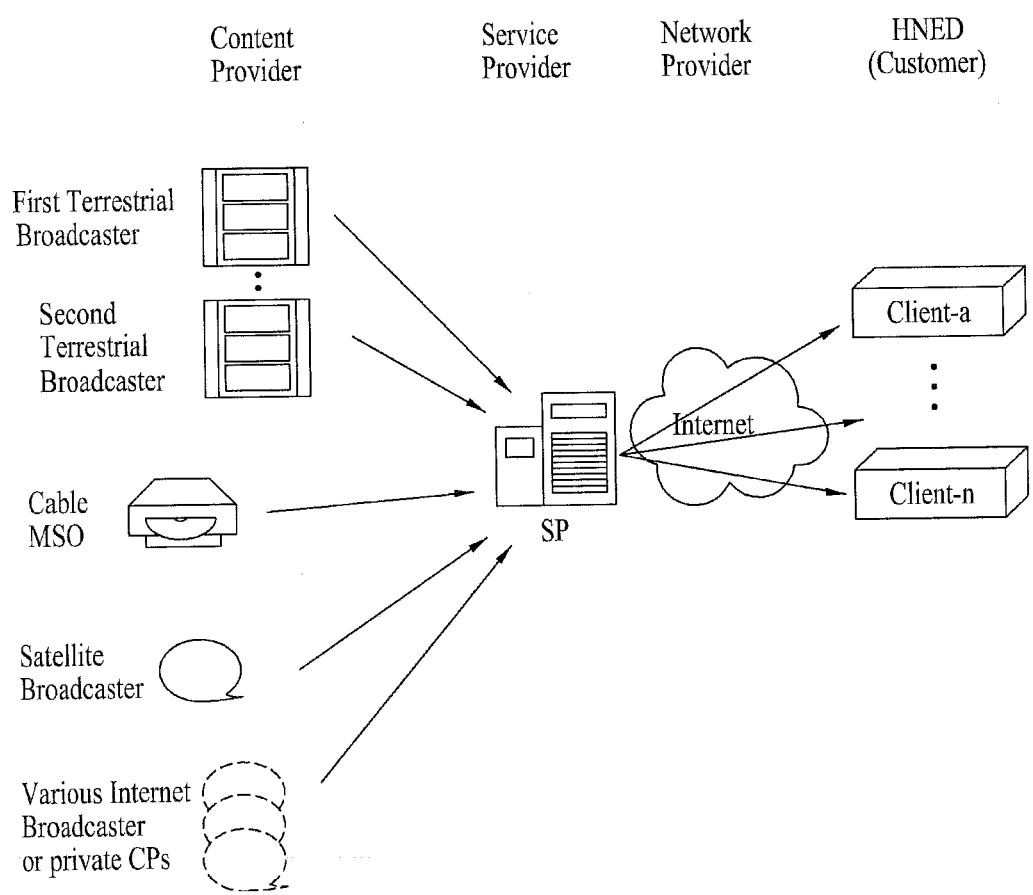
FIG. 1 is a diagram illustrating an IPTV system according to an embodiment.

Reference may now be made in detail to arrangements and embodiments of the present invention, examples of which may be illustrated in the accompanying drawings. Wherever possible, the same reference numbers may be used throughout the drawings to refer to the same or like parts. The detailed description may explain exemplary arrangements and embodiments, rather than to show the only embodiments that can be implemented. In the following description, a detailed description of known functions and configurations incorporated herein may be omitted when it may make the subject matter unclear.

Terms as disclosed herein may be defined in consideration and may correspond to general terms well known in the art, and may be differently determined according to intention of those skilled in the art, usual practices, and/or introduction of new technologies. A few terms may have been selected by the applicant as necessary and may hereinafter be disclosed in the following description. Operations of a digital broadcast receiver and a method for providing a graphical user interface may hereinafter be described with reference to the accompanying drawings.

A digital broadcast receiver may indicate a broadcast receiver capable of receiving digital broadcast data transmitted in a form of digital video and/or audio signals. Digital broadcasting may include compressing and transmitting a television (TV) signal according to a digital scheme for encoding/recoding information signals differently from analog broadcasting such that may perform bidirectional operation (i.e., two-way operation), reproduction, and/or accumulation. The digital broadcasting system may have a stronger resistance to noise than the analog broadcasting system such that it exhibits less data loss data as compared to the analog broadcasting system. Additionally, the digital broadcasting system may transmit additional error correction information so that it may easily perform error correction and provide high resolution and high definition display images. Furthermore, the digital broadcasting system may implement a bidirectional service (i.e., a two-way service) differently from the analog broadcasting system, such that it may receive a variety of broadcast services from broadcast stations and may allow a user to transmit information to the broadcast stations.

The term 'digital broadcast or digital broadcasting' as used herein may include not only terrestrial, satellite, and/or cable broadcastings but may also include other broadcasts transmitted over the Internet network. The digital broadcasting may further include Internet Protocol (IP) broadcasting.

The term 'digital broadcast receiver' as used herein may include a broadcast receiver capable of providing a user with Internet services. The Internet service may mean a variety of services capable of being transmitted over the Internet. These services may include Contents on Demand (CoD) services, YouTube services, information services (e.g. weather, news, local information, search, etc.), entertainment services (e.g. games, Karaoke, etc.), communication services (such as TV mail, TV Short Message Service (SMS)), etc. Therefore, a digital broadcast receiver may include a network TV, a Web TV, and/or a broadband TV. The term 'broadcast service' may include not only terrestrial, satellite, and/or cable broadcasting services but also Internet services.

A variety of system architectures may exist for transmitting digital broadcasting content. For example, the IPTV system, which is an example of a system capable of providing various contents over the Internet, may include a server, a network, and/or a receiver called a client.

The server of the IPTV system may include servers taking charge of various functions, such as a service discovery & selection information server, a streaming server, a content guide information server, a customer information server and/or a payment information server.

The streaming server may transmit Moving Picture Experts Group (MPEG)2 or MPEG4-encoded moving image data stored therein to the user over the network. A Real-Time Transport Protocol (RTP), RTP Control Protocol (RTCP), etc. may be used as protocols for the transmission.

In using a Real-Time Streaming Protocol (RTSP), the streaming server may control playback of a moving image stream to some degree through a function called Network Trick Play, including Pause, Replay, Stop, etc. However, the above-described protocols are disclosed for illustrative purposes, as other real-time transmission protocols may also be used.

The content guide information server may provide information about various contents. The content guide information may correspond to Electronic Program Guide (EPG) information and may include various information about content. The content guide information server may store content guide information data and provide the stored data to the receiver.

The service discovery & selection information server may provide the receiver with connection information, playback information, etc. about servers providing various content services such as broadcasting, Contents On Demand (COD) and/or games.

The network system may include an Internet-based network and gateways. The Internet-based network based on Internet Protocol (IP) may be any of various networks including an optical cable network, coaxial cable network, Fiber To The Home (FTTH), telephone network, wireless network, etc. The gateways may perform multicast group management using a protocol such as an Internet Group Management Protocol (IGMP), etc., Quality of Service (QoS) management and so forth, as well as general data transmission.

The receiver of the IPTV system may be capable of receiving data transmitted over the Internet and may provide the received data to the user. The receiver may be an IPTV set-top box, a homenet gateway, and/or a IPTV embedded TV, for example.

When the IPTV system is a hybrid type, it may provide various content provided over the Internet, as well as various existing broadcast content. The IPTV system may provide the user with various broadcast content, such as a terrestrial broadcast, cable broadcast, satellite broadcast and/or private broadcast, or various Internet image content and data content, etc. Such content may be provided in real time or on demand.

FIG. 1 is a diagram illustrating an IPTV system according to an embodiment. Other arrangements and embodiments may also be provided.

Referring to FIG. 1, in terms of provision of a content service, the IPTV system may be divided into a content provider (CP), a service provider (SP), a network provider (NP), and a customer or user.

The content provider may create and provide various content. For example, as shown in FIG. 1, the content provider may be any of a terrestrial broadcaster, a cable System Operator (SO) or Multiple System Operator (MSO), a satellite broadcaster, an Internet broadcaster, etc.

The service provider may package the various contents provided from the content provider into a service and provide the packaged service. For example, the service provider shown in FIG. 1 may package a first terrestrial broadcasting, a second terrestrial broadcast, a cable MSO, a satellite broadcast, various Internet broadcast content into a service, and/or provide the packaged service to the user.

The network provider may provide a network for provision of the packaged service to the user. The user may construct a Home Network End User (HNED) to receive the service.

The above-described IPTV system may employ conditional access, content protection, etc. as a means for protection of a content being transmitted. A CableCARD, Downloadable Conditional Access System (DCAS) and/or the like may be an example of the conditional access and/or content protection.

Figure 2:
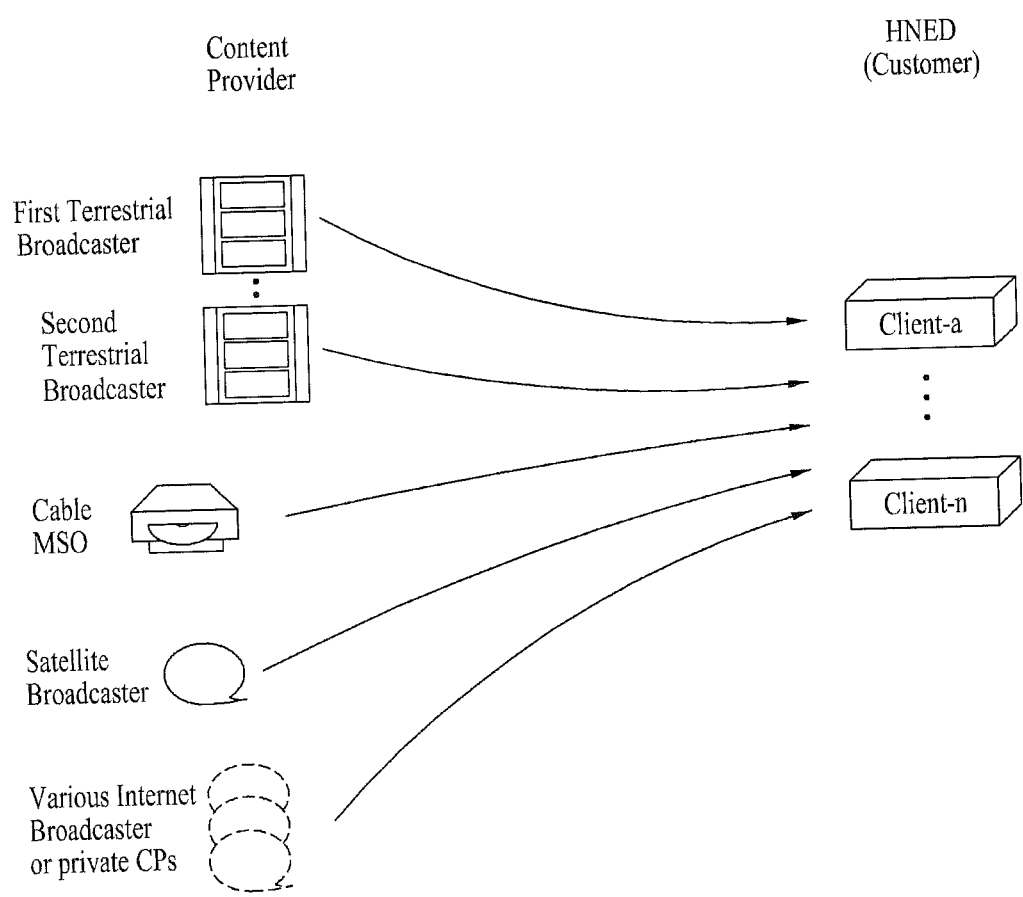
FIG. 2 is a diagram illustrating a network TV system according to an embodiment.

FIG. 2 is a diagram illustrating a network TV system according to an embodiment. Other arrangements and embodiments may also be provided.

Referring to FIG. 2, the network TV (shown on the right of FIG. 2) may receive digital broadcast data, or may be used as a digital broadcast receiver for receiving an Internet service and provide the user with the received Internet service. The network TV may be referred to as a broadband TV, and may include a Web TV. The Web TV may be a digital broadcast receiver capable of receiving and providing Web-based Internet services.

The network TV may directly receive the Internet service from the content provider over the Internet. The network TV may request necessary information from the content provider, receive the requested information, and/or provide the user with the received information. The network TV may download the user-requested content and software over the Internet, so that the network TV may reproduce the downloaded content and execute the downloaded software. The network TV may receive a Web page from the content provider, and may display the received Web page through a Web browser.

The network TV may receive a broadcast service over the Internet, receive a broadcast service from a terrestrial broadcaster through terrestrial waves, receive a broadcast service from a cable System Operator (SO) or Multiple System Operator (MSO) through cables, and/or receive a broadcast service from a satellite broadcaster through a satellite.

The digital broadcast receiver may receive a broadcast service from the service provider or the content provider using a unicast scheme or a multicast scheme.

Figure 3:
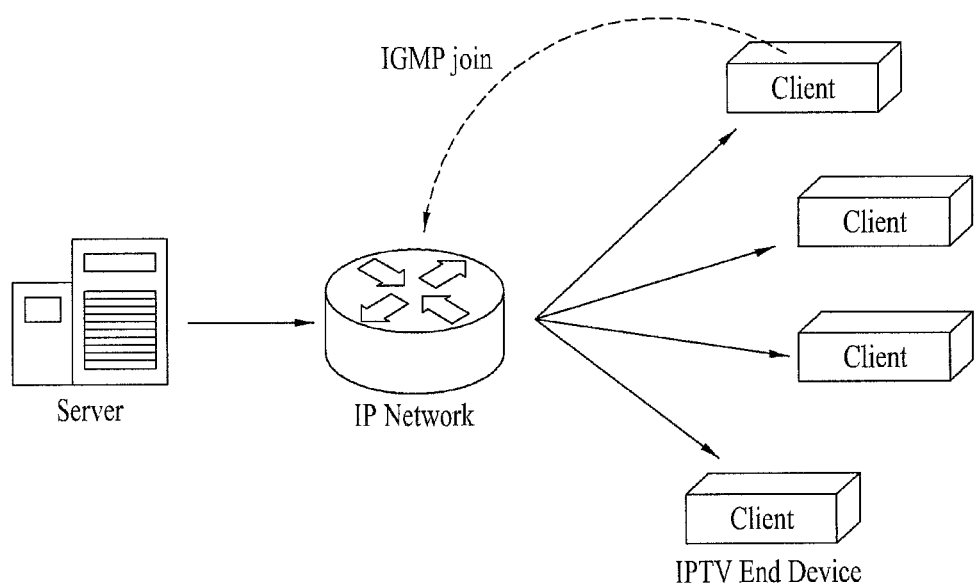
FIG. 3 is a diagram illustrating a multicast scheme according to an embodiment.
Figure 4:
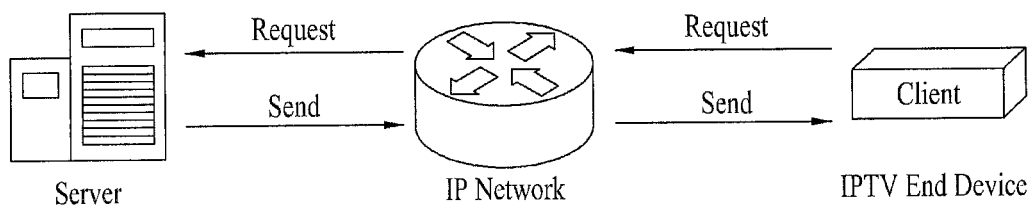
FIG. 4 is a diagram illustrating a unicast scheme according to an embodiment.

FIG. 3 is a diagram illustrating an multicast scheme according to an embodiment. FIG. 4 is a diagram illustrating a unicast scheme according to an embodiment. Other arrangements and embodiments may also be provided.

Referring to FIGS. 3 and 4, the unicast scheme may transmit data from one transmitter (or one sender) to one receiver on a one-to-one basis. For example, in the unicast scheme, if a receiver requests data from the server, the server may transmit data to the receiver in response to the request. The multicast scheme may transmit data to a plurality of receivers (i.e., a plurality of clients) contained in a specific group. For example, the service may simultaneously transmit data to a plurality of pre-registered receivers. In order to register the multicast scheme, Internet Group Management Protocol (IGMP) protocol and/or the like may be used.

Figure 5:
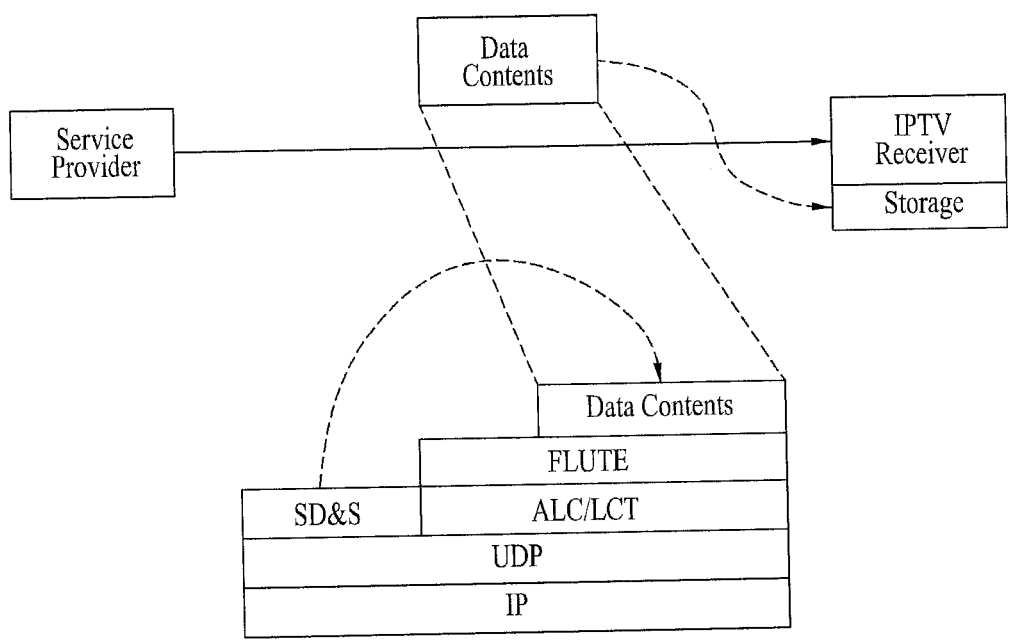
FIG. 5 is a view illustrating a hierarchical structure for a Content Download Service (CDS) for use in an IPTV system according to an embodiment.

FIG. 5 is a view illustrating a hierarchical structure for a Content Download Service (CDS) for use in an IPTV system according to an embodiment. Other arrangements and embodiments may also be provided.

Referring to FIG. 5, the service provider may transmit data content for a CDS (i.e., 'CDS data content') to the IPTV receiver using a transport protocol. The transmitted CDS data content may be stored in a storage unit of the IPTV system. The stored CDS data content may be executed at a request of a user. The transport protocol may be set to File Delivery over Unidirectional Transport (FLUTE) located on Asynchronous Layered Coding/Layered Coding Transport (ALC/LCT) of Internet Protocol/User Datagram Protocol (IP/UDP). Additionally, the transport protocol may also be set to DVB-STP, DVB data/object Carousel, File Transfer Protocol (FTP), and/or HyperText Transfer Protocol (HTTP). The above-described protocols are disclosed for illustrative purposes, as other transport protocols may also be used.

In the case where FLUTE is used as the transport protocol, a presence or an absence of the content download service (CDS) may be notified to the IPTV receiver through a service discovery & selection (SD & S) information server. Detailed information of the content may be found through metadata configured in a format of TV Anytime.

The data content for CDS may include a variety of content, for example, Audio/Video (A/V) content, data content, game content, etc.

The digital broadcast receiver including the IPTV may receive a variety of content, and may display the received content on a display screen according to an input signal selected by the user.

Figure 6:
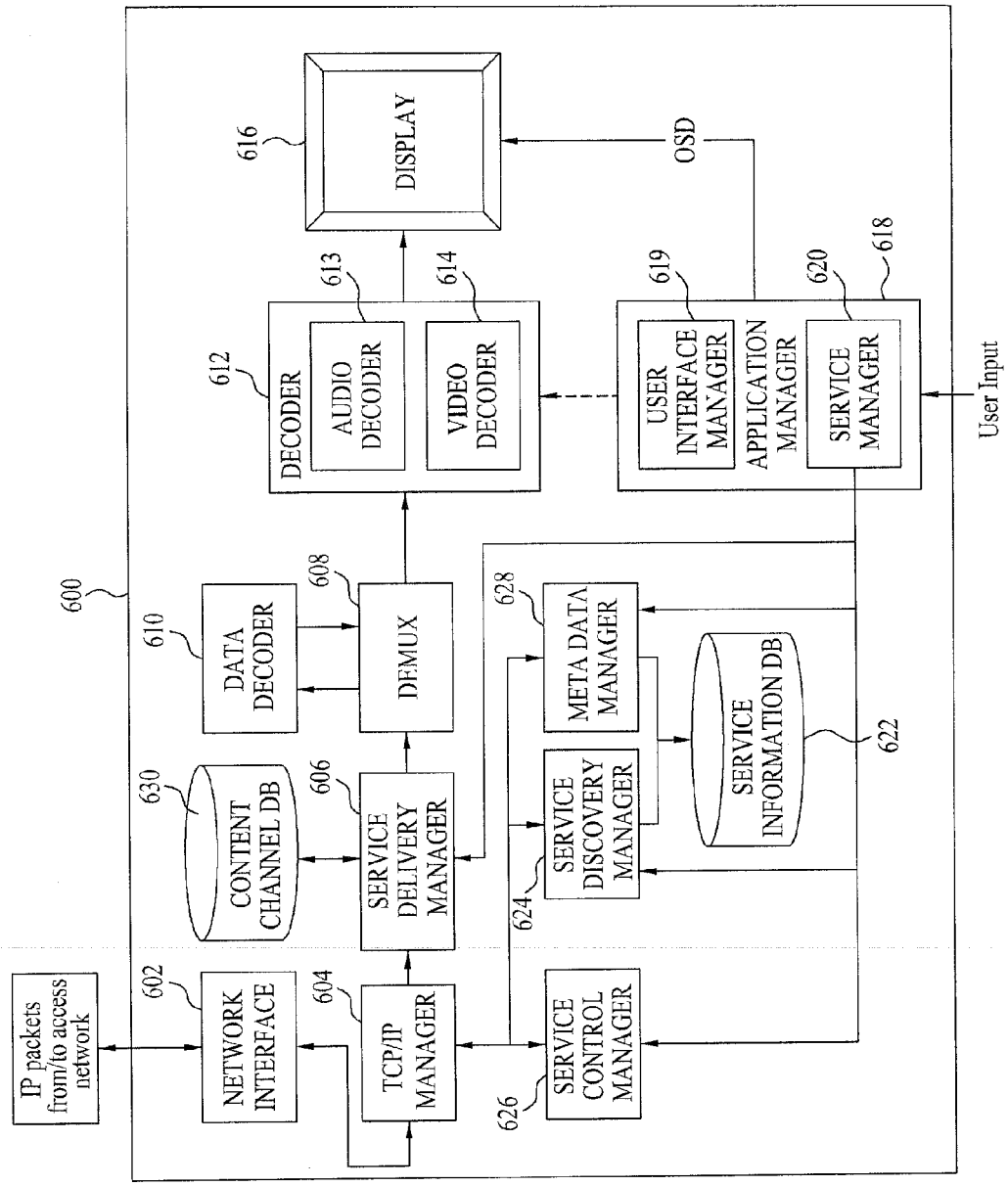
FIG. 6 is a block diagram illustrating a digital broadcast receiver according to an embodiment of the present invention.

FIG. 6 is a block diagram illustrating a digital broadcast receiver according to an embodiment of the present invention. Other arrangement, embodiments and configurations are also within the scope of the present invention.

As shown in FIG. 6, a digital broadcast receiver 600 may include an additional tuner capable of receiving terrestrial broadcasting, cable broadcasting, satellite broadcasting, and/or or the like. For ease of description and better understanding, parts for processing content transmitted over the Internet may be mainly described in the following.

The digital broadcast receiver 600 may include a network interface 602, an TCP/Internet Protocol (IP) manager 604, a service delivery manager 606, a demultiplexer (demux) 608, a data decoder 610, a decoder 612, a display 616, an application manager 618, a service information database (DB) 622, a metadata manager 628, and a content channel database (DB) 630. The display 616 may also be provided outside of the digital broadcast receiver 600.

The network interface 602 may receive packets from a network, and transmit the received packets to the network. The network interface 602 may receive an IP packet transferring broadcast data from a service provision server over the network. The broadcast data may include content data, an update message indicating whether content data is updated or not, metadata, service information data, and/or a software code.

In association with packets received at the digital broadcast receiver 600 and other packets transmitted from the digital broadcast receiver 600, the IP manager 604 may participate in packet transmission from a source to a destination. The IP manager 604 may classify the received packets according to proper protocols, and output the classified packets respectively belonging to the service delivery manager 606, the service discovery manager 624, the service control manager 626, and/or the metadata manager 628.

For example, upon receiving an update message, the IP manager 604 may output the received update message to the service control manager 626. The IP manager 602 may transmit a message requesting the update message having been generated from the service control manager 626 to the service provider.

The service delivery manager 606 may control the received service data. For example, in case of controlling real-time streaming data, a Real-Time Transport Protocol/RTP Control Protocol (RTP/RTCP) may be used. In case of transmitting the real-time streaming data using the RTP, the service delivery manager 606 may parse the received data packet using the RIP and transmit the parsed data packet to the demultiplexer 608, and/or store the received data packet in the content channel DB 630 upon receiving a control signal from the service manager 620. The service delivery manager 606 may feed back the network reception information to a server for providing a service using the RTCP.

The demultiplexer 608 may demultiplex the received packets into audio data, video data, Program Specific Information (PSI) data, etc., and may transmit the audio and video data to the decoder 612 and transmit the PSI data to the data decoder 610.

The data decoder 610 may receive service information such as the PSI and decode the received service information. The data decoder 610 may receive a PSI section, a Program and Service Information Protocol (PSIP) section, a DVB-Service Information (DVB-SI) section, and/or the like, having been demultiplexed by the demultiplexer 608, and then the data decoder 610 may decode the received sections.

The data decoder 610 may decode the received sections, create a database (DB) associated with service information, and store the created DB in the service information DB 622.

The decoder 612 may decode the video and audio data received from the demultiplexer 608. For this decoding operation, the decoder 612 may include the audio decoder 613 and the video decoder 614. The audio data decoded by the audio decoder 613 may be provided to the user through a speaker (not shown), and the video data and content decoded by the video decoder 614 may be provided to the user through the display 616, which may or may not be part of the digital broadcast receiver 600.

The application manager 618 may manage an overall status of the digital broadcast receiver 600, provide a user interface, and/or manage other managers. For this operation, the application manager 618 may include the user interface manager 619 and the service manager 620.

The user interface manager 619 may provide a graphical user interface (GUI) for the user using an On Screen Display (OSD) or the like, receive a key input signal from the user, and/or control a receiver operation in response to the received key input signal.

For example, the user interface manager 619 may receive a content channel setup input signal for certain content from the user. If the user interface manager 619 receives a key input signal associated with channel switching from the user, the user interface manager 619 may transmit the key input signal to the service manager 620. Additionally, upon receiving a key input signal associated with a specific content channel or another key input signal for requesting update information of the specific content channel from the user, the user interface manager 619 may transmit the received key input signal to the service manager 620.

Additionally, the user interface manager 619 may control a virtual keyboard or a virtual keypad to be displayed on a screen. The user can select/input a specific virtual key contained in either the virtual keyboard or the virtual keypad using up/down/left/right arrow keys and/or number keys of a remote controller. For example, the user interface manager 619 may receive a user ID and a password from the user, and may transmit the user ID and the password to a corresponding content provider.

The content channel DB 630 may assign a content channel to content, determine index data corresponding to the content, and/or store the index data and the assigned content channel information in such a manner that the index data correlates with the assigned content channel information.

As one example, if content is determined to be video or audio data 'child's growth moving image' stored in an internal memory of a broadcast receiver, the content channel DB 630 may store the corresponding content's directory 'D/video/Child's growth moving image . . . ' in association with the assigned content channel 'CH 1'.

As one example, if content is determined to be video or audio data 'King Sejong 11th' stored in a server connected to the network, the content channel DB 630 may store the corresponding content's network address '198.7//King Sejong/de//11th' in association with the assigned content channel 'CH 3'.

As one example, if content is determined to be an Internet site 'Yahoo widget', the content channel DB 630 may store a Web address of a corresponding Internet site 'http//:yahoo//widget// . . . ' in association with the assigned content channel 'CH2'.

Upon receiving a content channel switching command from the user, the broadcast receiver may determine index data corresponding to the changed content channel, and may output the corresponding content.

If the content channel switching command is determined to be a command for going up or down one channel, the broadcast receiver may read index data corresponding to content of a next or previous content channel stored in the content channel DB 630, and may output the content of the next or previous content channel.

Upon receiving an output command of the content channel from the user, the application manager 618 may read index data stored in the content channel DB 630, and may output the content.

If the application manager 618 receives the content channel switching command from the user, the application manager 618 may read index data of the switched channel and may output corresponding content.

If the channel switching command is determined to be a command for going up or down one channel, the broadcast receiver may read index data corresponding to content of a next or previous content channel stored in the content channel DB unit 630, and may output the content of the next or previous content channel.

In the case where the user selects the content channel mode and the content channel output command, the application manager 618 may read index data stored in the content channel DB 630 and may output the content.

The application manager 618 may determine whether a user-selected channel is a content channel or a general broadcast channel. If the user-selected channel is determined to be the content channel, the application manager 618 may read index data stored in the content channel DB 630 and may output the content.

In an example where the user selects the content channel mode and the content channel switching command, the application manager 618 may read index data corresponding to the switched content channel and may output the content command.

The index data may indicate a directory and a filename of the content and the content may be video or audio data stored in the internal memory of the broadcast receiver. The index data may be a network address of the content, and the content may be video or audio data stored in the server that is connected to the broadcast receiver over the network. The index data may be a Web address of the Internet site and the content may be a predetermined Internet site.

Upon receiving a predetermined key input signal (e.g., a menu command) from among output signals, the application manager 618 may output a parent folder (i.e., an upper folder) of a directory or folder including the content.

In an example where new content is updated in the directory or folder including the content or the content is changed to another in the above directory or folder, the application manager 618 may output the updated information or the changed information.

The display 616 may display the content on a display screen. The display 616 may be provided outside of the receiver 600.

The service manager 620 may control a variety of service-associated managers, such as the service delivery manager 606, the service discovery manager 624, the service control manager 626, the service discovery manager 624, the service control manager 626, the metadata manager 628, the IG-OITF client, and/or the like.

The service manager 620 may create a channel map for a general broadcast, and may select a channel using the channel map in response to a key input signal received from the user interface manager 619. The service manager 620 may receive channel service information from the data decoder 610, and may establish an audio/video (A/V) packet identifier (PID) of the selected channel in the demultiplexer 608.

The service discovery manager 624 may provide information needed for selecting the service provider for service provision. Upon receiving a signal associated with channel selection from the service manager 620, the service discovery manager 624 may search for a service using information of the received signal.

The service control manager 626 may perform a service selection and control function. For example, if the user selects a live broadcast service such as the existing broadcasting service, the service control manager 626 may use IGMP, RTSP, and/or the like. If the user selects a Video On Demand (VOD) service, the service control manager 626 may perform a service selection and control function using RTSP. The RTSP protocol may provide a trick mode for a real-time streaming. Additionally, the service control manager 626 may initialize and manage a session passing through an IMC gateway using an IP Multimedia Subsystem (IMS), a Session Initiation Protocol (SIP), etc. The above-described protocols may be disclosed for illustrative purposes, as other protocols may also be applied.

The metadata manager 628 may manage service-associated metadata, and may store the metadata in the service information DB 622.

The service information DB 622 may store the service information decoded by the data decoder 610, the metadata managed by the metadata manager 628, and information required for selecting the service provider provided from the service discovery manager 624. Additionally, the service information DB 622 may store setup data associated with a system, and/or the like therein.

The service information DB 622 or the content channel DB 630 may be implemented as a nonvolatile random access memory (NVRAM), a flash memory, and/or the like, and may be classified into two regions that are logically separated from each other in a same storage area.

The content channel DB 630 may store content that is controlled to be stored in a PVR manager (not shown). The PVR manager may collect metadata associated with the stored content, and may generate additional information (e.g., thumbnail images) to be used by the user.

Figure 7:
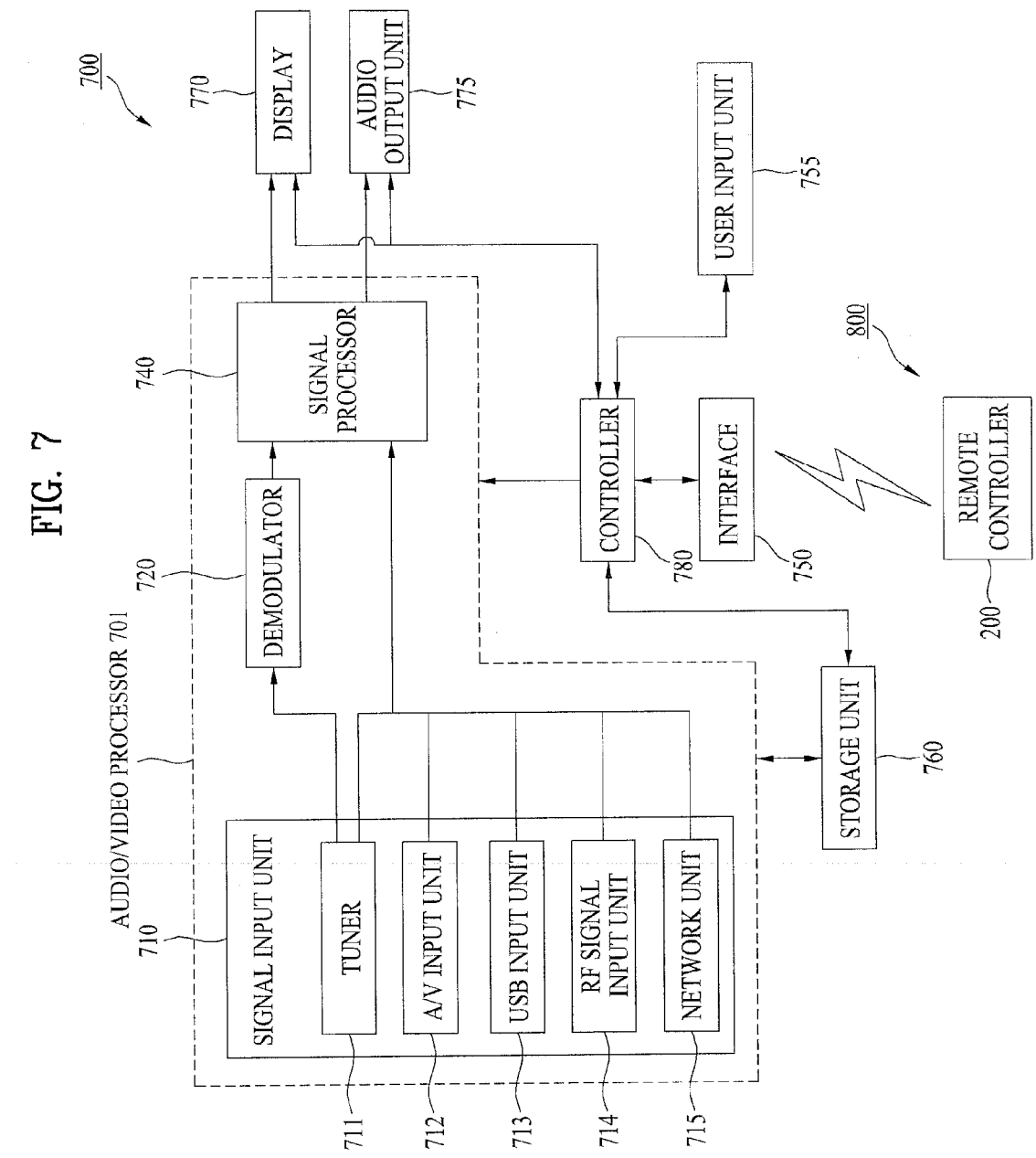
FIG. 7 is a block diagram illustrating a digital broadcast receiver according to an embodiment of the present invention.

FIG. 7 is a block diagram of a digital broadcast receiver according to an embodiment of the present invention. Other arrangements, embodiments and configurations are also within the scope of the present invention.

As shown in FIG. 7, the digital broadcast receiver 700 may include an audio/video processor 701, an interface 750, a storage unit 760 (or memory), a display 770, an audio output unit 775, and/or a controller 780.

The audio/video processor 701 may process input video and audio signals so that the audio/video processor 701 may output the input video signal to the display 770 (of the digital broadcast receiver 700) and may output the input audio signal to the audio output unit 775 (of the digital broadcast receiver 700). The audio/video processor 701 may include a signal input unit 710, a demodulator 720, and a signal processor 740. The signal input unit 710 may include a tuner 711, an audio/video (A/V) input unit 712, a USB input unit 713, a radio frequency (RF) signal input unit 714, and a network unit 715.

The tuner 711 may select an RF broadcast signal corresponding to a user-selected channel from among RF broadcast signals received via an antenna, and may convert the selected RF broadcast signal into an intermediate frequency (IF) signal or a baseband video or audio signal. For example, if the selected RF broadcast signal is a digital broadcast signal, the tuner 711 may convert the digital broadcast signal into a digital IF signal (DIF) signal. If the selected RF broadcast signal is an analog broadcast signal, the tuner 711 may convert the analog broadcast signal into an analog baseband video or audio signal (CVBS SIF: Composite Video Banking Sync/Sound Intermediate Frequency) signal. That is, the tuner 711 may process the digital broadcast signal or the analog broadcast signal. The analog baseband video or audio signal (CVBS SIF) generated from the tuner 711 may be directly input to the signal processor 740.

The tuner 711 may receive a single-carrier RF broadcast signal according to an Advanced Television System Committee (ATSC) scheme and/or may receive a multi-carrier RF broadcast signal according to a Digital Video Broadcasting (DVB) scheme.

The digital broadcast receiver 700 may also include at least two tuners. In an example where the digital broadcast receiver 700 includes at least two tuners, a second tuner may select an RF broadcast signal corresponding to a user-selected channel from among RF broadcast signals received via the antenna in a similar way to the first tuner, and may convert the selected RF broadcast signal into the IF signal or the baseband video or audio signal.

The second tuner may sequentially select RF broadcast signals of all broadcast channels stored through a channel memory function from among received RF broadcast signals, and may convert the selected RF broadcast signals into the IF signals or baseband video or audio signals. The second tuner may periodically perform conversion operations of all broadcast channels. Therefore, the digital broadcast receiver 700 may display an image of a broadcast signal converted by the first tuner, and at a same time display images of several channels having been converted by the second tuner in a form of thumbnail images. The first tuner may convert the user-selected main RF broadcast signal into an IF signal or a baseband video or audio signal. The second tuner may sequentially and periodically select all RF broadcast signals except for the main RF broadcast signal, and may convert the selected RF broadcast signals into the IF signal or the baseband video or audio signal.

The demodulator 720 may receive the digital IF (DIF) signal converted by the tuner 711, and may demodulate the received DIF signal. For example, if the digital IF (DIF) signal generated from the tuner 711 is based on the ATSC scheme, the demodulator 720 may demodulate the DIF signal using 8-Vestigial Side Band (8-VSB) modulation. For another example, if the digital IF signal generated from the tuner 711 is based on the DVB scheme, the demodulator 720 may demodulate the DIF signal using Coded Orthogonal Frequency Division Modulation (COFDMA).

The demodulator 720 may further perform channel decoding. For the channel decoding, the demodulator 720 may include a Trellis Decoder, a deinterleaver, a Reed Solomon decoder, etc., so that the Trellis decoding, deinterleaving, and Reed Solomon decoding may be performed.

The demodulator 720 may perform demodulation and channel decoding, and may then output a Transport Stream (TS) signal. A video signal, an audio signal, and/or a data signal may be multiplexed in the TS signal. For example, the TS signal may be an MPEG-2 Transport Stream (TS) in which an MPEG-2 video signal and a Dolby AC-3 audio signal are multiplexed. The MPEG-2 TS may include a header of 4 bytes and a payload of 184 bytes.

The TS signal generated from the demodulator 720 may be provided to the signal processor 740. The signal processor 740 may demultiplex and process the TS signal, output a video signal to the display 770, and output an audio signal to the audio output unit 775.

A digital broadcast receiver having at least two tuners may have a similar number of demodulators. A demodulator may also be separately provided for each of ATSC and DVB.

The signal input unit 710 may connect the digital broadcast 700 to an external device. The external device may be an audio or video output device, for example, a Digital Versatile Disc (DVD) player, a Blu-ray disc player, a game player, a camcorder, a computer (laptop), etc. The signal input unit 710 may apply an audio, video, or data signal received from the external device to the signal processor 740 for processing the audio and video signals in the digital broadcast receiver 700.

In order to provide the digital broadcast receiver 700 with the audio and video signals received from the external device, the A/V input unit 712 of the signal input unit 710 may include an Ethernet port, a Universal Serial Bus (USB) port, a Composite Video Banking Sync (CVBS) port, a component port, an S-video port (analog), a Digital Visual Interface (DVI) port, a High Definition Multimedia Interface (HDMI) port, a Red, Green, Blue (RGB) port, a D-SUB port, an Institute of Electrical and Electronics Engineers (IEEE) 1394 port, Sony/Phillips Digital InterFace (SPDIF) port, a Liquid HD port, etc. Analog signals received through the CVBS port or the S-video port may be provided to the signal processor 740 after analog-to-digital conversion. Digital signals received through the other input ports may be provided to the signal processor 740 without analog-to-digital conversion.

The USB input unit 713 may receive audio and video signals through the USB port.

The RF signal input unit 714 may connect the digital broadcast receiver 700 to a wireless network. The digital broadcast receiver 700 may wirelessly access the Internet through the RF signal input unit 714. A variety of wireless Internet access communication technologies may be used, for example, Wireless LAN (WNAN) (Wi-Fi), Wireless broadband (WiBro), World Interoperability for Microwave Access (WiMax), High Speed Downlink Packet Access (HSDPA), etc. The RF signal input unit 714 may conduct short range communication with another electronic device. A variety of short range communication technologies may be used such as Bluetooth, Radio Frequency Identification (RFID), Infrared Data Association (IrDA), Ultra Wideband (UWB), ZigBee, etc.

Besides the RF signal input unit 714, the Ethernet port may also be utilized for connecting the digital broadcast receiver 700 to a network. The signal input unit 710 may further include a network unit 715 for effective network connection and management. The network unit 715 may connect the digital broadcast receiver 700 to a network through a PSTN, a LAN, a CABLE, etc.

The signal input unit 710 may be connected to a variety of set-top boxes through at least one of the above-described ports, so that the signal input unit 710 may perform input/output (I/O) operations for the set-top box. For example, in order to implement bidirectional communication in the set-top box acting as an IPTV set-top box, the video, audio, and data signals having been processed in the IPTV set-top box may be transmitted to the controller 780, or signals having been processed in the controller 780 may be transmitted to the IPTV set-top box.

The digital broadcast receiver may process a broadcast signal from a propagation medium, a signal from an external input device, a signal transmitted over a wired or wireless network, etc.

The signal processor 740 may demultiplex a received stream signal (for example, MPEG-2 TS) into a video signal, an audio signal, and a data signal. The signal processor 740 may also process the demultiplexed video signal. For example, if the demultiplexed video signal is an encoded video signal, the signal processor 740 may decode the encoded video signal. More specifically, if the demultiplexed video signal is an MPEG-2 coded video signal, the MPEG-2 decoder may decode the MPEG-2 coded video signal. If the demultiplexed video signal was coded in compliance with an H.264 scheme for Digital Multimedia Broadcasting (DMB) and/or Digital Video Broadcasting-Handheld (DVB-H), an H.264 decoder may decode the video signal.

The signal processor 740 may control brightness, tint, and/or color for the video signal. The video signal processed by the signal processor 740 may be displayed on the display 770. The signal processor 740 may also process the demultiplexed audio signal. For example, if the demultiplexed audio signal was coded, the signal processor 740 may decode the audio signal. More specifically, if the demultiplexed audio signal is an MPEG-2 coded audio signal, an MPEG-2 decoder may decode the audio signal. If the demultiplexed audio signal was coded in compliance with MPEG-4 Bit Sliced Arithmetic Coding (BSAC) for terrestrial DMB, an MPEG-4 decoder may decode the audio signal. If the demultiplexed audio signal was coded in compliance with MPEG 2 Advanced Audio Codec (AAC) for satellite DMB or DVB-H, an AAC decoder may decode the audio signal.

The signal processor 740 may control bass, treble, and/or volume for the audio signal.

The audio signal processed by the signal processor 740 may be provided to the audio output unit 775. The signal processor 740 may also process the demultiplexed data signal. For example, if the demultiplexed data signal was coded, the signal processor 140 may decode the data signal. The coded data signal may be Electronic Program Guide (EPG) information including broadcasting information such as start times, end times, etc. of broadcast programs of each channel. For example, the EPG information may be ATSC-Program and System Information Protocol (ATSC-PSIP) information in case of ATSC. In an example of DVB, the EPG information may include DVB-Service Information (DVB-SI). The ATSC-PSIP information or the DVB-SI information may be included in a 4-byte header of the above-mentioned TS (i.e., MPEG-2 TS).

The signal processor 740 may perform On Screen Display (OSD) processing. More specifically, the signal processor 740 may display information graphically or in text on the display 770 based on at least one of the processed video and data signals or a user input signal received through a remote controller 200 (or remote control device). The remote controller may also be considered a pointing device.

The storage unit 760 may store programs for signal processing and control operations of the controller 780 and may store processed video, audio or data signals. The storage unit 760 may also temporarily store video, audio or data signals received at the signal input unit 710.

The storage unit 760 may include a storage medium of at least one type of flash memory, hard disk, multimedia card micro type, card-type memory (e.g. Secure Digital (SD) or eXtreme Digital (XD) memory), Random Access Memory (RAM), and/or Read Only Memory (ROM) (e.g. Electrically Erasable Programmable ROM (EEPROM)). The digital broadcast receiver 700 may reproduce a file stored in the storage unit 760 (e.g. a moving image file, a still image file, a music file, a text file, etc.) and provide the reproduced file to the user.

The controller 780 may control overall operations of the digital broadcast receiver 700. The controller 780 may receive a signal from the remote controller 200 via the interface 750. The controller 780 may identify a user input command applied to the remote controller 200 by referring to the received signal and control the digital broadcast receiver 700 based on the user input command. For example, upon receipt of a predetermined channel selection command from the user, the controller 780 may control the tuner 711 to provide a selected channel through the signal input unit 710. The controller 780 may control the signal processor 740 to process the audio and video signals of the selected channel. The controller 180 may also control the signal processor 740 to output user-selected channel information along with the processed audio and video signals to the display 770 or the audio output unit 775.

As another example, the user may enter a different-type video or audio output command through the remote controller 200. The user may wish to view a video signal of a camera or a camcorder received through the USB input unit 713, rather than a broadcast signal. In this example, the controller 780 may control the audio/video processor 701 such that an audio or video signal received through the USB input unit 713 of the signal input unit 710 is processed by the signal processor 740 and output the same to either the display 770 or the audio output unit 775.

Besides a command received through the remote controller 200, the controller 780 may identify a user command received through the user input unit 755 for the digital broadcast receiver 700, and the controller 780 may control the digital broadcast receiver 700 based on the user command. For example, the user may enter an on/off command, a channel switch command, a volume change command, and/or the like for the digital broadcast receiver 700 by using the user input unit 755. The user input unit 755 may include buttons and/or keys formed as part of the digital broadcast receiver 700. The controller 780 may determine whether the user input unit 755 has been manipulated and the controller 780 may control the digital broadcast receiver 700 based on the determination.

Figure 8:
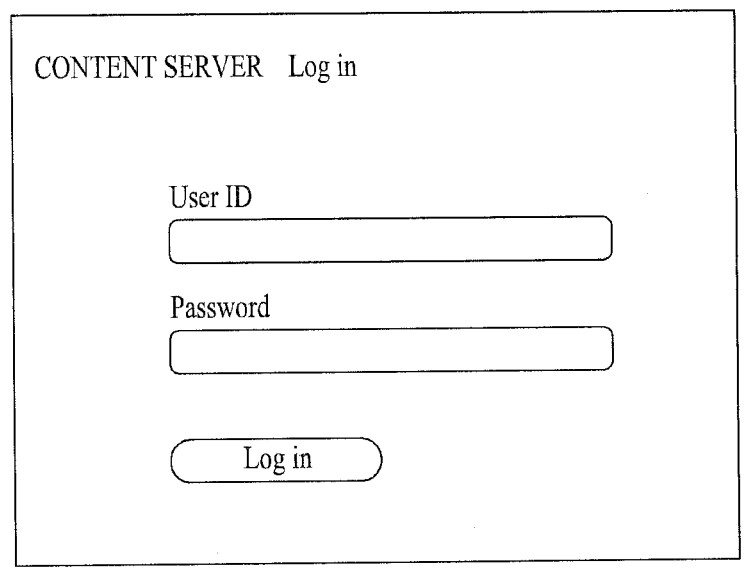
FIG. 8 shows an example of a display image for a log-in process according to an embodiment.

FIG. 8 shows a display image for a log-in process according to an embodiment. Other arrangements and embodiments may also be provided.

The digital broadcast receiver may invite a user to enter a user ID and/or a password on a display image as shown in FIG. 8. In order to utilize the broadcast service, the user may log in as a member of a Web site of a content provider or a service provider, for example.

In order to enter the user ID and the password, the user may enter characters and numbers using character and number keys of the remote controller (or remote control device). The user may enter characters and numbers using a virtual keyboard or a virtual keypad displayed on the display screen. When the user enters the characters and numbers using the virtual keyboard or the virtual keypad, the digital broadcast receiver may enable the user to select virtual keys contained in the virtual keyboard or the virtual keypad using an indicator. That is, the user may move an indicator to a position of a desired virtual key to be input using up/down/left/right arrow keys of the remote controller, may click on a selection button of the remote controller, and/or may thus enter information of a corresponding virtual key to the digital broadcast receiver.

For not only rapid selection operation but also prevention of password exposure to another person, the digital broadcast receiver may enable the user to select a specific virtual key of the virtual keyboard or the virtual keypad using a multi-indicator.

Figure 9:
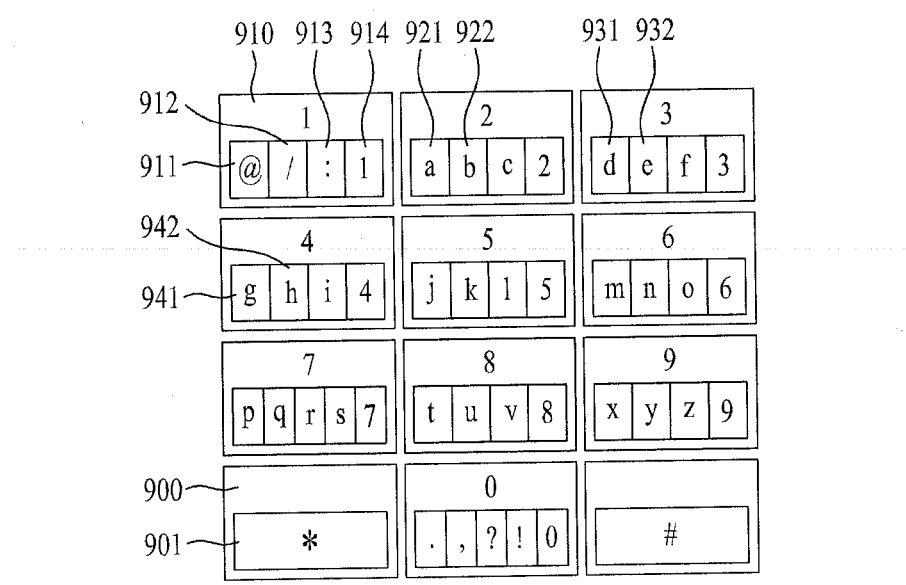
FIG. 9 shows an example of arrangement of virtual keys according to an embodiment.

FIG. 9 shows an arrangement of virtual keys according to an embodiment of the present invention. Other arrangements, embodiments and configurations are also within the scope of the present invention.

The controller 780 (shown in FIG. 7) may control the display 770 such that several input regions 911, 912, 921, 922, 931, 932, 941, and 942 assigned to respective virtual keys on the screen are displayed as shown in FIG. 9. Information about the virtual key may include at least one of a character, a number, and/or a symbol. For example, the virtual key information may include symbols such as '@ / : * . , ? ! #', numbers such as '1 2 3 4 5 6 7 8 9 0', and characters such as 'a b c de f g h i j k l m n o p q r s'. In this example, the user interface manager 619 (shown in FIG. 6) may conduct a same function as in the controller 780.

A set region may include one or more input regions. That is, one or more input regions may be contained in the set region. For example, the input regions 911, 912, 913, and 914 may construct or form the set region 910. The input region 901 may construct the set region 900.

The digital broadcast receiver may allocate a set selection command for enabling the user to select each set region. In order for the user to easily recognize the set selection command allocated to the set region, the set region may further include an identifier for indicating the allocated set selection command. For example, input regions 911, 912, 913, and 914 contained in the set region 910 may correspond to an identifier '1'. The other set regions may also correspond to the identifiers '2', '3', '4', '5', '6', '7', '8', '9' and '0'.

Figure 10:
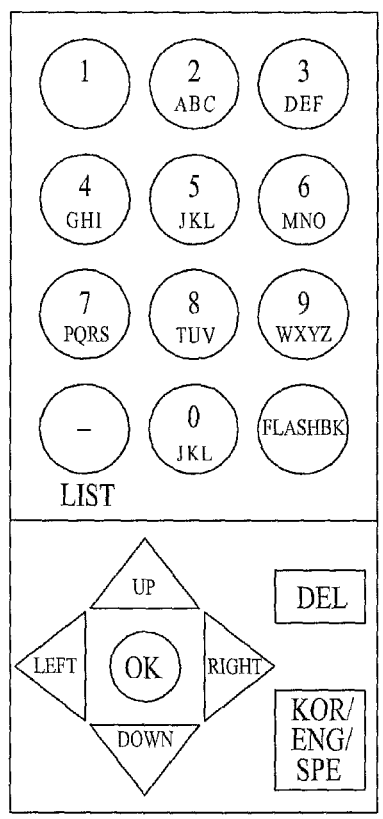
FIG. 10 shows an example of arrangement of keys of a remote controller according to an embodiment.

FIG. 10 shows an arrangement of keys of a remote controller (or remote control device) according to an embodiment. Other arrangements and embodiments may also be provided.

As shown in FIG. 10, the remote controller (or remote control device) may include number keys (1, 2, 3, 4, 5, 6, 7, 8, 9, and 10), arrow keys (Up, Down, Left, Right), a selection key (OK), and/or hot keys (Del, Korean/English/Special Characters 'Kor/Eng/Spe'). The number keys of the remote controller may be used as keys for entering set selection commands assigned to the respective set regions. If the user presses number keys of the remote controller, the pressed number key information may be input to the controller 780, and the controller 780 may recognize or determine information about the user-input number keys as a set selection command such that the controller 780 may recognize or determine that the user has selected a corresponding set region. For example, if the user enters the number button '1' from among buttons (or keys) of the remote controller, the controller 780 may recognize or determine that the user selected the set region 910 (as shown in FIG. 10).

The up/down/left/right arrow keys of the remote controller (or remote control device) may be used as a key for entering a move command. The user may press arrow keys such that the user may select a specific input region from among several input regions contained in the selected set region. For example, if the set region 910 is selected and the input region 911 contained in the set region 910 is selected, the user may select the input region 912 by pressing one arrow key (Right).

The selection key (OK) may be used to enter a selection command. That is, if the user presses the selection key (OK), the controller 780 may receive information about a virtual key assigned to a currently-selected input region. In other words, the controller 780 may recognize (or determine) information of the virtual key that is currently assigned to the selected input region, and the controller 780 may determine that the recognized virtual key information is input.

A hot key 'Del' may be used to cancel information of the input virtual key. The other hot key 'Korean/English/Special Characters' (Kor/Eng/Spe) may be used to select any of Korean, English, special characters, etc. If the user presses the hot key 'Korean/English/Special Characters', information of the virtual key assigned to the input region may be changed to any one of Korean, English, and/or special characters.

Figure 11:
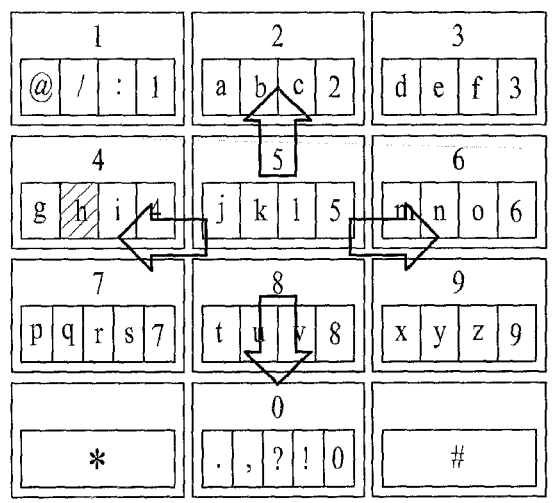
FIG. 11 is a diagram illustrating a method for entering information of virtual keys through the display image (of FIG. 9) according to an embodiment of the present invention.

FIG. 11 is a diagram illustrating a method for entering information of virtual keys through the display image (of FIG. 9) according to an embodiment of the present invention. Other arrangements, embodiments and configurations are also within the scope of the present invention.

Referring to FIG. 11, the controller 780 may provide (or locate) the indicator at the selected input region so that the selected input region including the indicator may be displayed separately from other input regions. For example, if the user desires to enter a user ID 'happy', the user may firstly press the number key '4' and then press the arrow key 'Right', and the indicator may be located at the input region 'h'. In this example, if the user presses the selection key 'OK', the controller 780 may receive virtual key information 'h' assigned to the input region 'h'.

If the user then presses the number key '2', then the indicator may be provided (or located) at the input region 'a'. If the user then presses the selection key 'OK', then the controller 780 may receive virtual key information assigned to the input region 'a'.

If the user presses the number key '7', then the indicator may be located at the input region 'p'. If the user then presses the selection key 'OK', then the controller 780 may receive virtual key information 'p' assigned to the input region Subsequently, if the user again presses the selection key 'OK', then the controller 780 may again receive the virtual key information 'p' assigned to the input region 'p'.

If the user presses the number key '9', then the indicator may be located at the input region 'x'. If the user then presses the arrow key 'OK', then the indicator may be located at the input region 'y'. If the user presses the selection key 'OK', then the controller 780 may receive virtual key information 'y' assigned to the input region 'y'.

The controller 780 may control the display 770 to display a display region for displaying a user ID entered by the user on the screen. The user may recognize current input information by referring to the display region. The display region may be the user ID input window shown in FIG. 8. For example, if the controller 780 receives virtual key information 'h', the controller 780 may control the virtual key information 'h' to be displayed on the display region. Subsequently, if the controller 780 receives the virtual key information 'a', the controller 780 may control the virtual key information 'a' to be additionally displayed on the display region. If the user presses all information 'happy' of the user ID, a word 'happy' may be displayed on the display region.

Figure 12:
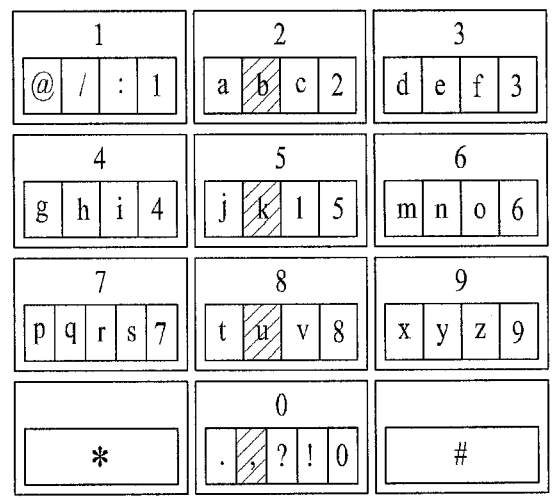
FIG. 12 is a diagram illustrating a method for entering information of virtual keys through the display image (of FIG. 9) according to an embodiment of the present invention.

FIG. 12 is a diagram illustrating a method for entering information of virtual keys through the display image (of FIG. 9) according to an embodiment of the present invention. Other arrangements, embodiments and configurations are also within the scope of the present invention.

Referring to FIG. 12, the controller 780 may display at least two of input regions (b, k, u, ',') in a different way from other input regions. The selected input region may be any one of the input regions (b, k, u, ','). A plurality of indicators may be displayed in a manner such that the input regions (b, k, u, ',') are displayed differently from other input regions. The controller 780 may select the differently-displayed input regions to be contained in different set regions.

If the controller 780 receives a password from an authorized user, the controller 780 may display at least two input regions in a row direction or a column direction differently from other input regions so that another user who views a display screen may be prevented from recognizing a password of the authorized user.

If the controller 780 receives a set selection command, the controller 780 may display at least two input regions differently from other input regions.

The controller 780 may display a plurality of input regions, and then the controller 780 may display at least two input regions to be displayed differently from the other input regions.

When the user desires to enter a password 'abcd', if the user firstly presses the number key '2', an indicator may be located at each of input regions (a, j, t, '.') corresponding to a column that includes the input region (a). If the user then presses the selection key (OK), the controller 780 may receive virtual key information 'a' assigned to the input region (a). In this example, an indicator may be located at each of input regions (@, a, d) corresponding to a row, rather than each of input regions (a, j, t, '.') corresponding to a column that includes the input region (a).

If the user presses the arrow key (Right), an indicator may be located at each of input regions (b, k, u, ',') corresponding to a column having the input region (b). If the user then presses the selection key (OK), the controller 780 may receive virtual key information 'b' assigned to the input region (b).

The user may press the arrow key (Right), and the indicator may be located at each of input regions (c, l, v, ?) corresponding to a column having the input region (c). If the user then presses the selection key (OK), the controller 780 may receive virtual key information 'c' assigned to the input region (c).

If the user presses the number key '3', an indicator may be located at each of input regions (d, m, x, #) corresponding to a column that includes the input region (d). If the user then presses the selection key (OK), the controller 780 may receive virtual key information (d) assigned to the input region (d).

The controller 780 may control the display 770 to display a display region for displaying a password entered by the user. In this example, the controller 780 may also control the display 770 to display other information different from user-input information so as to prevent the password from being exposed. The display region may be the password input window shown in FIG. 8. Whenever the controller 780 receives each character of the password, the controller 780 may display an asterisk '*'. In this example, the user may recognize an input situation of information being received through the display region. For example, upon receipt of the character 'a', the controller 780 may control the asterisk to be displayed on the display region. Next, upon receipt of the character 'b', the controller 780 may control the asterisk '*' to be displayed on the display region. If the entirety of the user ID 'abcd' is entered by the user, the display region may display '****'.

Figure 13:
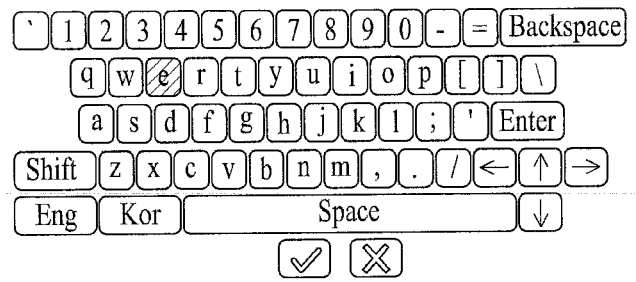
FIG. 13 shows an example of arrangement of keys of a remote controller according to an embodiment of the present invention.

FIG. 13 shows an arrangement of keys of a remote controller (or remote control device) according to an embodiment of the present invention. Other arrangements, embodiments and configurations are also within the scope of the present invention.

Referring to FIG. 13, several input regions assigned to respective virtual keys may be arranged in a form of a virtual keyboard. Identifiers for indicating the assigned virtual keys may be displayed on respective input regions. For example, '1', 'a', '/', and 'Space' in respective input regions may correspond to the identifiers. An indicator may also be displayed to indicate the selected input region. In FIG. 13, the indicator may be located at the input region (e). The indicator may be shifted by arrow keys (Up, Down, Left, Right). If the user presses the selection key (OK) of the remote controller, the controller 780 may receive information of a virtual key assigned to the input region at which the indicator is located.

Figure 14:
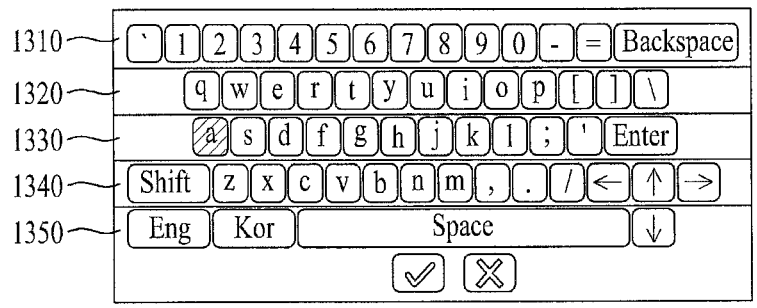
FIG. 14 is a diagram illustrating a method for entering information of virtual keys through the display image (of FIG. 13) according to an embodiment of the present invention.

FIG. 14 is a diagram illustrating a method for entering information of virtual keys through the display image (of FIG. 13) according to an embodiment of the present invention. Other arrangements, embodiments and configurations are also within the scope of the present invention.

As shown in FIG. 14, each of the set regions 1310, 1320, 1330, 1340, and 1350 may include one or more input regions. That is, one or more input regions may be provided in one set region. The set region may be composed of input regions arranged in the same row. For example, input regions ('", 1, 2, 3, 4, 5, 6, 7, 8, 9, 0, _, =, Backspace) may construct the set region 1310. Each of the other set regions 1320, 1330, 1340 and 1350 may be based on the input regions within a specific row of the virtual keys.

A method for selecting the set region, selecting an input region contained in the selected set region, and receiving virtual key information assigned to the selected input region may correspond to those of FIG. 11, and as such a detailed description may be omitted.

Although the indicator may be located at only one input region, as may be seen from the arrangement of virtual keys shown in FIG. 14, the controller 780 may display at least two input regions (4, r, f, v) differently from other input regions. The selected input regions may be any one of input regions (4, r, f, v). In this example, a plurality of indicators may be used to display the input regions (4, r, f, v) differently from other input regions. The controller 780 may also select the differently displayed input regions to be contained in different set regions.

Upon receiving a password from the authorized user, the controller 780 may display at least two input regions differently from other input regions so as to prevent another user who views the display image from recognizing the password entered by the authorized user. In FIG. 14, the method for entering the password through the display image may correspond to the method described above with respect to FIG. 12, and as such a detailed description may be omitted herein.

Figure 15:
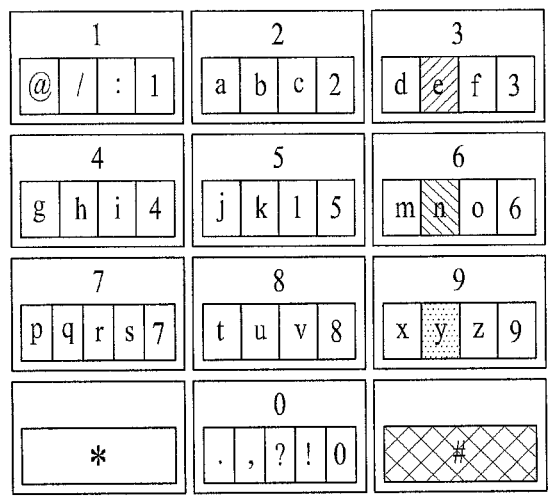
FIG. 15 is a diagram illustrating a method for entering information of virtual keys through the display image (of FIG. 9) according to an embodiment of the present invention.

FIG. 15 is a diagram illustrating a method for entering information of virtual keys through the display image (of FIG. 9) according to an embodiment of the present invention. Other arrangements, embodiments and configurations are also within the scope of the present invention.

Referring to FIG. 15, the controller 780 may control at least two of input regions (e, n, y, #) to be displayed in different colors so that these differently displayed input regions may be displayed differently from the remaining input regions. For example, indicators having different colors may be located at input regions (e, n, y, #), respectively.

In another embodiment, the differently displayed input regions do not need to be a specific row or column, but rather may be different input regions. The indicators may be differently displayed rather than differently displayed input fields. Additionally, the differently displayed input regions may be highlighted differently and/or with a different color (or colors).

A selection command for selecting a specific color in order to select any one of the input regions having different colors may be assigned. The remote controller (or remote control device) may include a color key for entering the selection command for selecting a specific color. If the user desires to select any one of the input regions having different colors, the user may press the remote controller's color key that has a color corresponding to a color of an input region assigned a virtual key having user-desired information. The color key corresponding to the input region may have a color that is closely related to the color of the input region (e.g. a same color, a similar color, and/or the same series color, etc). The highly related color, such as a same color, a similar color, and/or the same series color, may be determined, for example, according to a distance between color coordinates in the CIE (International Commission on Illumination) system of color specification. For example, the CIE system of color specification assigned to user-entered color keys of the remote controller may be compared with respective CIE systems of color specification assigned to several input regions so that it can be determined that the input region having the shortest distance in the CIE system of color specification was selected.

If the user enters the move command, the controller 780 may change the input regions having different colors to other input regions. For example, if the user presses the right arrow key, the controller 780 may change differently-colored input regions (e, n, y, #) to other input regions (f, o, z, #). If several indicators having different colors are located at input regions (e, n, y, #), the controller 780 may move the several indicators to other input regions (f, o, z, #).

Figure 16:
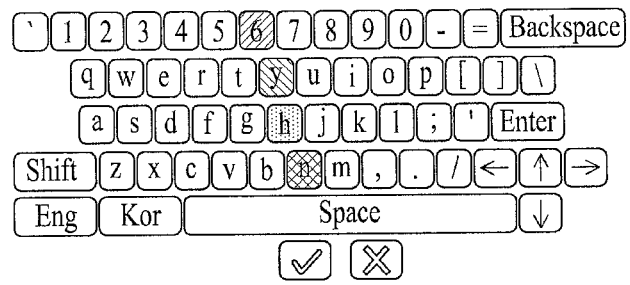
FIG. 16 is a diagram illustrating a method for entering information of virtual keys through the display image (of FIG. 13) according to an embodiment of the present invention.

FIG. 16 is a diagram illustrating a method for entering information of virtual keys through the display image (of FIG. 13) according to an embodiment of the present invention. Other arrangements, embodiments and configurations are also within the scope of the present invention.

Referring to FIG. 16, the controller 780 may control at least two of input regions (6, y, h, n) to be displayed in different colors so that these differently displayed input regions may be displayed differently from the remaining input regions. For example, indicators having different colors may be located at input regions (6, y, h, n), respectively.

In a same/similar manner as FIG. 15, the remote controller may include a color key for entering the selection command to select a specific color. If the user desires to select any one of input regions having different colors, the user may press the remote controller's color key that has a color corresponding to a color of an input region assigned a virtual key having user-desired information. The color key corresponding to the input region may have a color that is closely related to the color of the input region (e.g. the same color, a similar color, and/or the same series color, etc).

If the move command is entered by the user, the controller 780 may change the input regions having different colors to other input regions. For example, if the user presses the right arrow key, the controller 780 may change differently-colored input regions (6, y, h, n) to other input regions (7, u, j, m).

If the user presses the other arrow key (Down), the controller 780 may change differently-colored input regions (6, y, h, n) to other input regions (y, h, n, Space).

In FIG. 16, several input regions arranged in a column direction may be displayed in different colors so that the differently displayed input regions may be displayed differently from the remaining input regions. For example, four input regions (1, 2, 3, 4) arranged in a row direction may be displayed in different colors, and the displayed input regions may be shifted in units of four input regions according to movement of arrow keys.

For example, if the user presses the right arrow key the controller 780 may change differently colored input regions (1, 2, 3, 4) to other input regions (5, 6, 7, 8). If the user then presses the arrow key (Down), the controller 780 may change differently colored input regions (1, 2, 3, 4) to other input regions (q, w, e, r).

Figure 17:
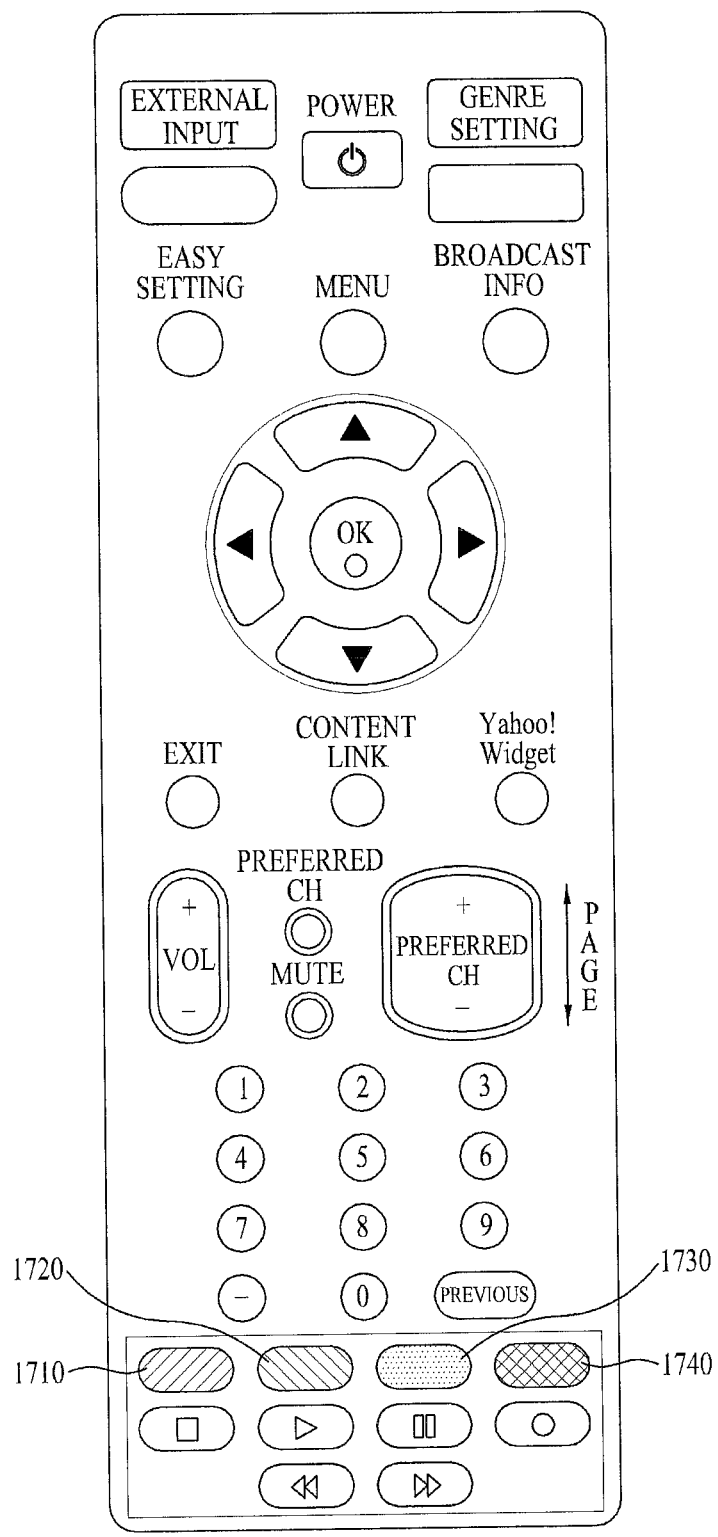
FIG. 17 shows an example of a remote controller including color keys according to an embodiment of the present invention.

FIG. 17 shows a remote controller that includes color keys according to an embodiment of the present invention. Other arrangements, embodiments and configurations are also within the scope of the present invention.

Referring to FIG. 17, if the user presses any one of color keys 1710, 1720, 1730, and 1740, virtual key information assigned to the input region having the same or similar color as the color of the user-pressed color key from among differently colored input regions (e, n, y, #) shown in FIG. 15 may be entered. For example, if the user presses one color key 1710, the controller 780 may receive virtual key information assigned to the input region (e) having a color corresponding to the color of the user-pressed color key 1710.

If the user presses any one of color keys 1710, 1720, 1730, and 1740, virtual key information assigned to the input region having the same or similar color as the color of the user-pressed color key from among differently colored input regions (6, y, h, n) shown in FIG. 16 may be entered. For example, if the user presses the color key 1710, the controller 780 may receive virtual key information assigned to the input region (6) having a color corresponding to the color of the user-pressed color key 1710.

Figure 18:
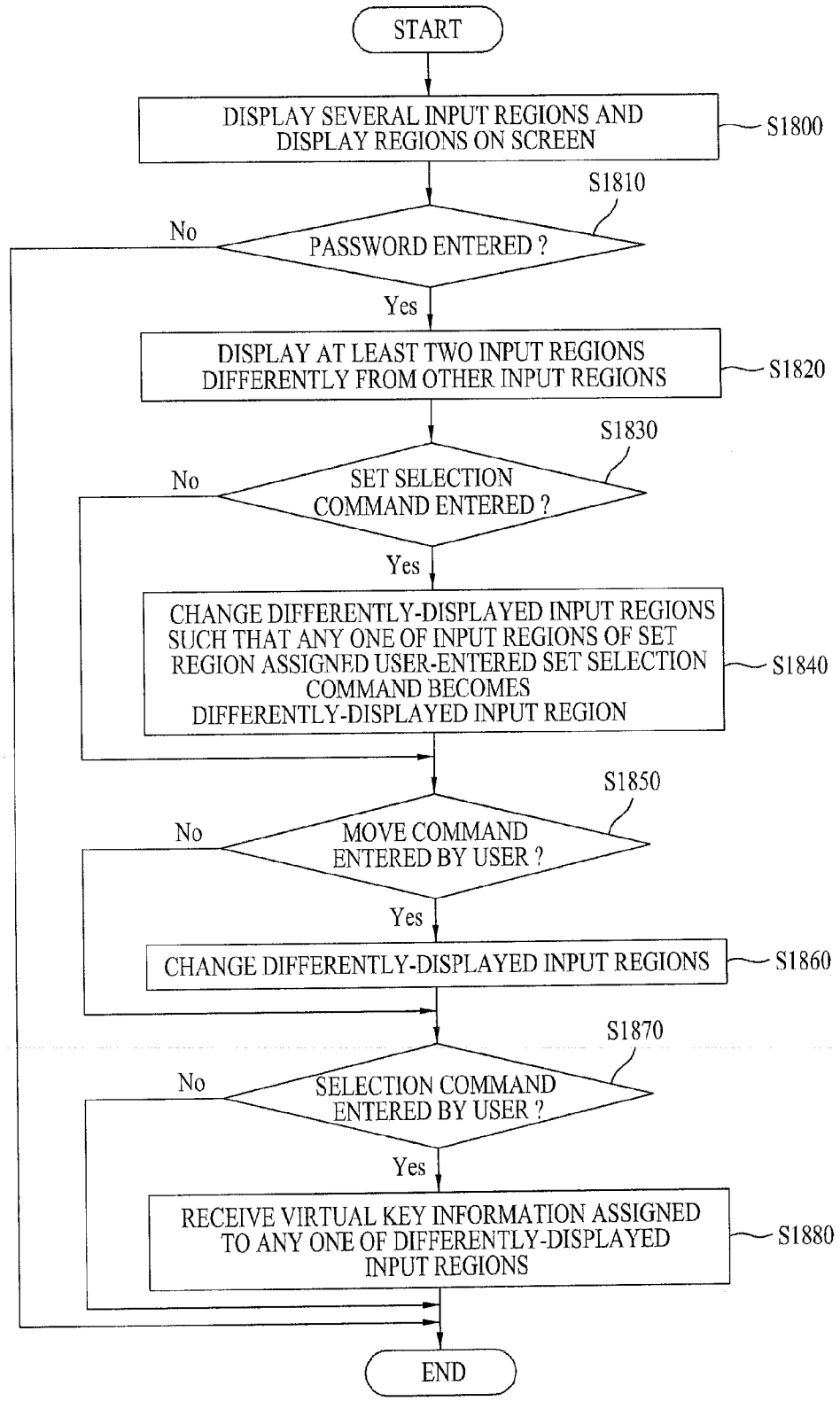
FIG. 18 is a flowchart of a method for providing a graphical user interface according to an embodiment of the present invention.

FIG. 18 is a flowchart illustrating a method for providing a graphical user interface according to an embodiment of the present invention. Other operations, orders of operations and embodiments are also within the scope of the present invention.

As shown in FIG. 18, the digital broadcast receiver may display several input regions assigned to respective virtual keys on the screen at operation S1800. The virtual key information may include at least one of a character, a number, and/or a symbol. The digital broadcast receiver may further display a display region displaying the input of the user-entered virtual key on the screen. The display region may be a user ID input window or a password input window. The digital broadcast receiver may arrange a plurality of input regions in the form of a virtual keyboard or a virtual keypad.

The digital broadcast receiver may determine whether a password is entered at operation S1810. If the password is input, the digital broadcast receiver may display at least two of the input regions differently from other input regions at operation S1820. In this example, the digital broadcast receiver may provide the indicator at each of the at least two input regions so that the at least two input regions are displayed differently from other input regions. One or more input regions may construct or form a set region, and the differently-displayed input regions may be contained in different set regions, respectively. The set selection command for selecting the set region may be assigned to the set region, and the set region may further include an identifier for indicating the assigned set selection command.

The digital broadcast receiver may determine whether the set selection command is entered at operation S1830. If the set selection command was entered, the digital broadcast receiver may change the differently-displayed input regions to other input regions such that any one of input regions contained in the set region assigned the user-entered set selection command may become the differently-displayed input regions at operation S1840. In this example, the digital broadcast receiver may change the differently-displayed input regions to input regions contained in different set regions located at a row or column to which the input regions of the above-described set region belong.

The digital broadcast receiver may determine whether the user entered a move command at operation S1850. Upon receipt of the move command, the digital broadcast receiver may change the differently-displayed input regions to other input regions at operation S1860.

The digital broadcast receiver may determine whether the selection command is entered at operation S1870. If the selection command was entered by the user at operation S1870, the digital broadcast receiver may receive virtual key information assigned to any one of the differently-displayed input regions at operation S1880. In this example, the digital broadcast receiver may display information different from the user-entered virtual key information on the display region.

Figure 19:
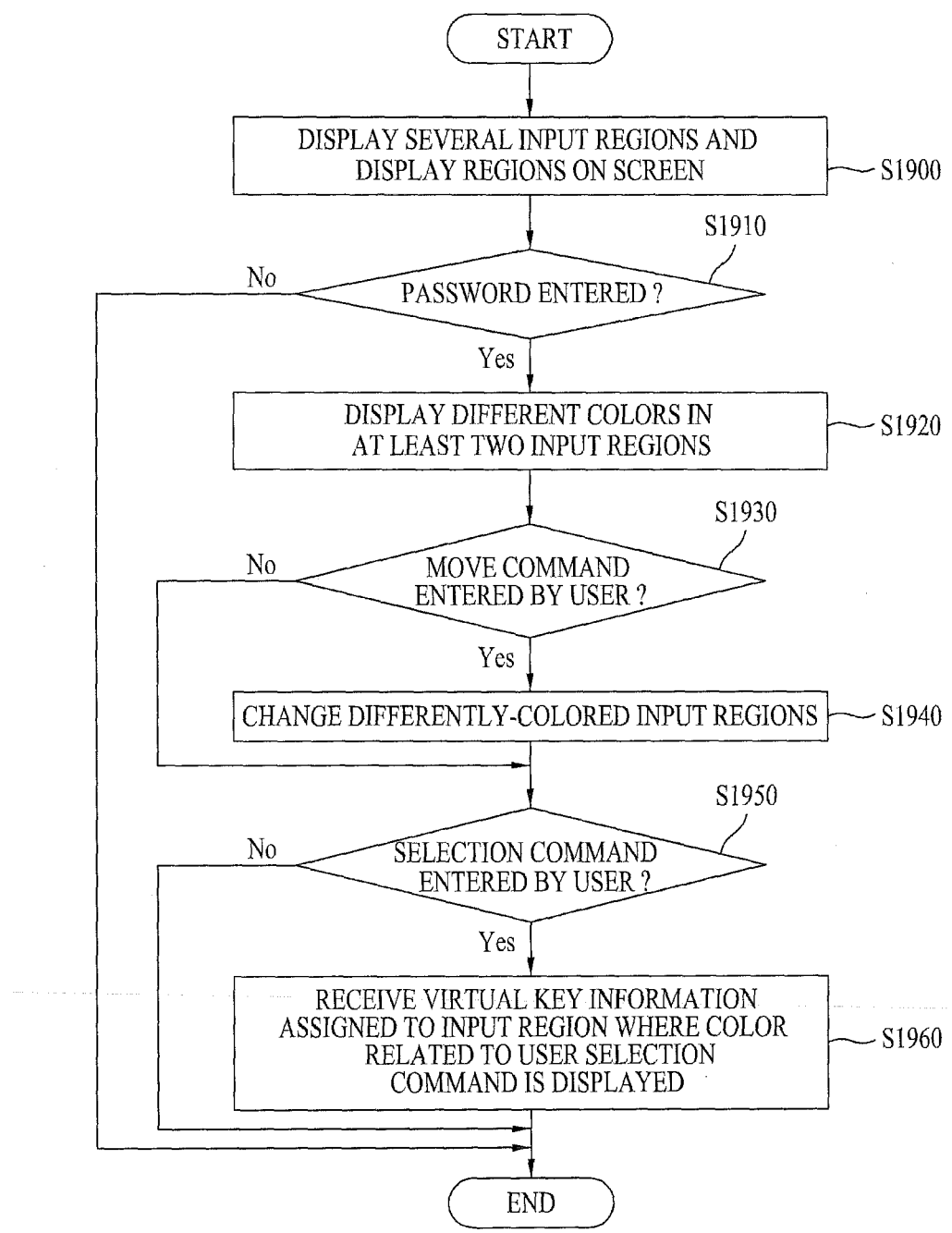
FIG. 19 is a flowchart of a method for providing a graphical user interface according to an embodiment of the present invention.

FIG. 19 is a flowchart illustrating a method for providing a graphical user interface according to an embodiment of the present invention. Other operations, orders of operations and embodiments are also within the scope of the present invention.

Referring to FIG. 19, the digital broadcast receiver may display several input regions assigned to respective virtual keys on the screen at operation S1900. In this example, the virtual key information may include at least one of a character, a number, and/or a symbol. The digital broadcast receiver may further display a display region displaying the input of the user-entered virtual key on the screen. The display region may be a user ID input window or a password input window. The digital broadcast receiver may arrange a plurality of input regions in the form of a virtual keyboard or a virtual keypad.

The digital broadcast receiver may determine whether a password is entered at operation S1910. If the password is input, the digital broadcast receiver may display at least two of the input regions differently from other input regions at operation S1920. In this example, the digital broadcast receiver may provide indicators having different colors at least two input regions, respectively, so that the at least two input regions may be displayed differently from other input regions. The input regions having different colors may be input regions contained in the same row or the same column.

The digital broadcast receiver may determine whether the user entered a move command at operation S1930. Upon receipt of the move command, the digital broadcast receiver may change the differently-displayed input regions to other input regions at operation S1940.

The digital broadcast receiver may determine whether the selection command was entered at operation S1950. The selection command may be a command for selecting a specific color. If the user entered the selection command at operation S1950, the digital broadcast receiver may receive virtual key information assigned to the input region where a color related to a specific color indicated by the selection command is displayed at operation S1960. In this example, the color related to the specific color indicated by the selection command may be at least one of the same color, a similar color, and the same series color, etc. In this example, the digital broadcast receiver may display information different from the user-entered virtual key information on the display region.

Embodiments of the present invention may be realized as a computer-readable code written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium may be distributed over a plurality of computer systems connected to a network so that a computer-readable code is written thereto and executed therefrom in a decentralized manner.

The digital broadcast receiver and the method for providing a graphical user interface may enable a user to easily enter desired information through a graphical user interface displayed on the screen, prevent another user who views the screen from recognizing user-entered virtual key information, and thus prevent the user-entered information from being exposed to other users.

Embodiments of the present invention may be directed to a digital broadcast receiver and a method for providing a graphical user interface that substantially obviate one or more problems due to limitations and disadvantages of the related art.

An embodiment of the present invention may provide a digital broadcast receiver for allowing a user to easily enter desired information using a graphical user interface displayed on a display screen, and a method for providing the graphical user interface.

An embodiment of the present invention may provide a digital broadcast receiver that prevents the information from being leaked outside when a user enters information using a graphical user interface displayed on a screen, and a method for providing the graphical user interface.

An embodiment of the present invention may provide a digital broadcast receiver and a method for providing a graphical user interface that allow a user to easily enter desired information using a graphical user interface displayed on a screen, and may prevent a virtual key entered by another user from being recognized, and thereby prevent (or reduce) user-entered information from being leaked.

To achieve these embodiments and other objects/advantages, as embodied and broadly described herein, a method may provide a graphical user interface in a digital broadcast receiver. The method may include displaying a plurality of input regions assigned to respective virtual keys on a screen, displaying at least two of the input regions differently from other input regions, receiving a selection of one of the differently-displayed input regions, and recognizing virtual key information assigned to the selected input region. The virtual key information may include at least one of a character, a number, or a symbol.

The displaying of the at least two of the input regions may be performed when a password is entered. The displaying of the at least two of the input regions may be automatically performed without receiving a specific command.

The differently-displayed input regions may be arranged in one of a row direction or a column direction.

The method for providing the graphical user interface may further include displaying information different from the recognized virtual key information on the screen.

The method for providing the graphical user interface may further include changing the differently-displayed input regions to other input regions when a move command is entered.

At least one of the input regions may be constructed as a set region. The differently-displayed input regions may be contained in different set regions, respectively. The set region may be assigned a set selection command for selecting the set region.

The method for providing the graphical user interface may further include displaying one input region contained in the set region assigned the entered set selection command differently from the remaining input regions when the set selection command is entered.

The set region may further include an identifier for indicating the assigned set selection command.

Receiving the selection may include selecting one of the differently-displayed input regions based on the set selection command.

The displaying of the at least two of the input regions may include displaying the differently-displayed input regions to have different colors.

The method for providing the graphical user interface may further include recognizing virtual key information assigned to an input region having a color that is closely related to the specific color when a selection command for selecting a specific color is entered.

In an embodiment of the present invention, a digital broadcast receiver may include a display configured to display a screen, and a controller configured to display a plurality of input regions assigned to respective virtual keys on the screen, to display at least two of the input regions differently from other input regions, to receive a selection of one of the differently-displayed input regions, and to recognize virtual key information assigned to the selected input region.

The controller may control the differently-displayed input regions to be displayed in different colors.

The controller may recognize virtual key information assigned to an input region having a color that is closely related to the specific color when a selection command for selecting a specific color is entered.

At least one of the input regions may be constructed as a set region, and the differently-displayed input regions may be contained in different set regions.

In another embodiment of the present invention, a method may provide a graphical user interface in a digital broadcast receiver. The method may include displaying a plurality of set regions including at least one input region assigned a virtual key on a screen, and displaying a single input region contained in the selected set region and at least one input region differently from the remaining input regions when a set selection command for selecting one of the set regions is entered, the at least one input region being arranged in a row direction or a column direction on a basis of the single input region. The method may also include receiving a selection of one of the differently-displayed input regions, and recognizing virtual key information assigned to the selected input region.

The set region may further include an identifier for indicating the assigned set selection command.

The method for providing the graphical user interface may further include displaying a single input region contained in the different set region and at least one input region differently from the remaining input regions when a set selection command for selecting a set region different from the selected set region is entered, the at least one input region being arranged in a row direction or a column direction based on the single input region.

The set selection command for selecting the different set region may be entered in at least one of a first case (or example) in which the identifier is entered and a second case (or example) in which an arrow key is entered.

Receiving a selection of one of the differently-displayed input regions may include selecting one of the differently-displayed input regions based on the set selection command.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for providing a graphical user interface in a digital television, the method comprising:

displaying virtual keys on a screen, the virtual keys being provided in a plurality of regions, each region having an identifier and characters that are unique from other regions;

in response to receiving first input corresponding to selection of the identifier for selection of a desired character, displaying, on the screen, a single character within a region corresponding to the identifier differently from other characters during a user ID input mode; and in response to receiving second input corresponding to selection of the identifier for selection of a desired character, displaying, on the screen, multiple characters differently from other characters during a password input mode, wherein each of the multiple characters has a same column direction or a same row direction, and wherein a specific character among the multiple characters is positioned in a first region corresponding to the identifier, the other characters among the multiple characters are positioned in a second region, and the second region is different from the first region.

2. The method according to claim 1, further comprising: determining virtual key information assigned to the selected identifier.

3. The method according to claim 2, wherein the virtual key information includes at least one of a character, a number, or a symbol.

4. The method according to claim 1, wherein the differently displaying of the single character and the other characters is automatically performed without receiving a specific command.

5. The method according to claim 1, wherein the single character and the other characters are provided in a same row direction or a same column direction of the screen.

6. The method according to claim 1, further comprising:
in response to receiving a move command, changing the display of the single character and the other characters.

7. The method according to claim 1, wherein at least one of the plurality of regions forms a set region.

8. The method according to claim 7, wherein the set region is assigned a set selection command for selecting the set region.

9. The method according to claim 8, further comprising:
in response to receiving the set selection command, displaying one region contained in the set region assigned the set selection command differently from other regions.

10. The method according to claim 9, wherein the set region includes an identifier for indicating the assigned set selection command.

11. The method according to claim 9, wherein the receiving the selection includes selecting one of the plurality of regions based on the set selection command.

12. The method according to claim 1, wherein the single character and the other characters are displayed in different colors.

13. The method according to claim 12, further comprising:
in response to receiving a selection command for selecting a specific color, determining virtual key information assigned to a region of the desired character or the other characters having a color that is closely related to the specific color.

14. A digital broadcast receiver comprising:
a display configured to display a screen; and
a controller configured to display virtual keys on a screen, the virtual keys being provided in a plurality of regions, each region having an identifier and characters that are unique from other regions, wherein in response to receiving a first input corresponding to selection of the identifier for selection of a desired character, the controller displays, on the screen, a single character within the region corresponding to the identifier differently from other characters during a user ID input mode, and in response to receiving second input corresponding to selection of the identifier for selection of a desired character, the controller displays, on the screen, multiple characters differently from other characters during a password input mode, wherein each of the multiple characters has a same column direction or a same row direction, wherein a specific character among the multiple characters is positioned in a first region corresponding to the identifier, the other characters among the multiple characters are positioned in a second region, and the second region is different from the first region.

15. The digital broadcast receiver according to claim 14, wherein the controller determines virtual key information assigned to the selected identifier.

16. The digital broadcast receiver according to claim 15, wherein the virtual key information includes at least one of a character, a number, or a symbol.

17. The digital broadcast receiver according to claim 14, wherein the single character and the other characters are provided in one of a same row direction or a same column direction of the screen.

18. The digital broadcast receiver according to claim 14, wherein in response to receiving a move command, the controller changes the display of the single character and the characters.

19. The digital broadcast receiver according to claim 14, wherein at least one of the plurality of regions forms a set region.

20. The digital broadcast receiver according to claim 19, wherein in response to receiving a set selection command, the controller displays one region contained in the set region assigned the set selection command differently from other regions.

21. The digital broadcast receiver according to claim 19, wherein the set region includes an identifier for indicating the assigned set selection command.

22. The digital broadcast receiver according to claim 14, wherein the single character and the characters are displayed in different colors.

23. The digital broadcast receiver according to claim 22, wherein in response to receiving a selection command for selecting a specific color, the controller determines virtual key information assigned to an input region of the single character or the other characters having a color that is closely related to the specific color.

* * * * *